Dec. 9, 1924.
S. E. NOLOP
FLUSH TANK
Filed Feb. 19, 1924
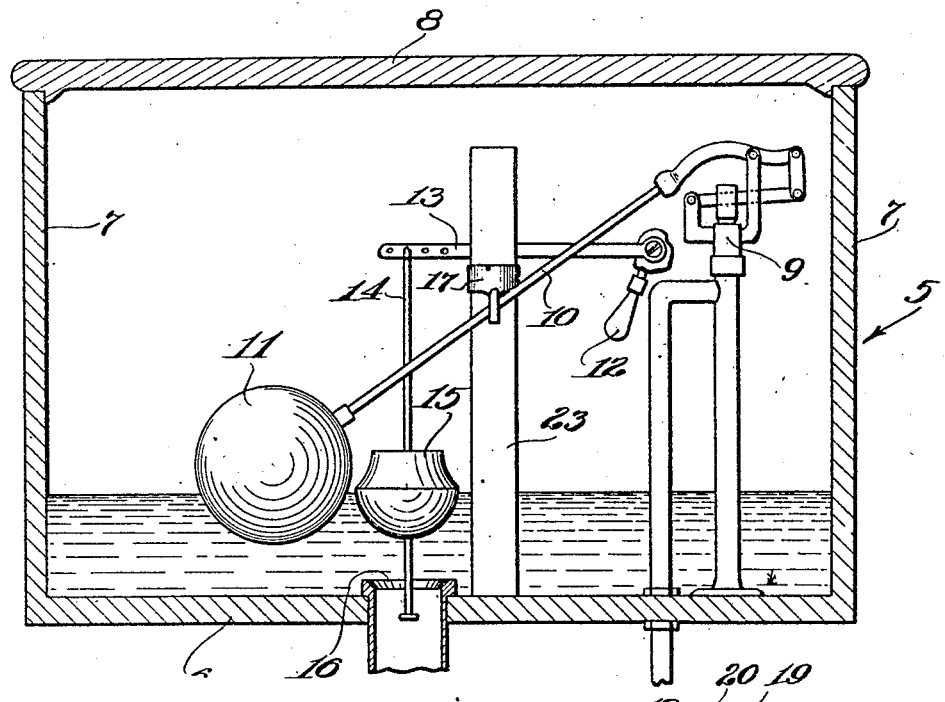
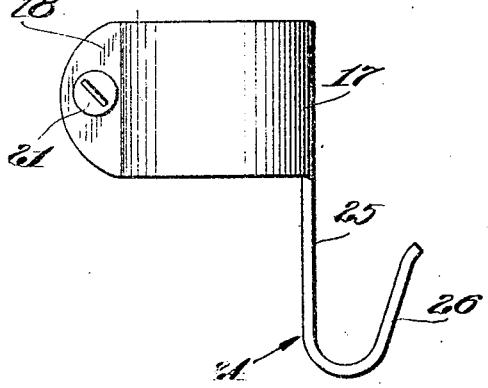

Patented Dec. 9, 1924.

1,518,699

UNITED STATES PATENT OFFICE.

SARAH E. NOLOP, OF VENICE, CALIFORNIA.

FLUSH TANK.

Application filed February 19, 1924. Serial No. 693,758.

*To all whom it may concern:*

Be it known that I, SARAH E. NOLOP, a citizen of the United States, residing at Venice, in the county of Los Angeles and State of California, have invented new and useful Improvements in Flush Tanks, of which the following is a specification.

This invention relates to flush tanks and more particularly to means for controlling the action of the float ball of a flush tank.

In the operation of the usual form of flush tank, the float ball, during its movement downward, comes into contact with the ball valve, displaces it from its true position and causes it to be improperly seated, which condition permits the water to continue to run through the tank until the ball valve is manually placed in correct position on its seat.

It is therefore an object of my invention to provide means for controlling or limiting the movement of a float ball in a flush tank so that the ball will not interfere with the action of the valve.

Another object of my invention is the provision of adjustable means whereby the movement of a float ball will be limited to a predetermined position.

With the foregoing objects in view, together with such other objects and advantages as may subsequently appear, my invention consists in the construction and arrangement of parts hereinafter described and claimed and illustrated in the accompanying drawings, in which:—

Figure 1 is a sectional view of a cistern or tank containing the usual mechanism, Fig. 2 is a side elevation of means for limiting the movement of a float ball, and Fig. 3 is a plan view of the device shown in Fig. 2.

Referring to the drawings for a more detailed description thereof, the numeral 5 indicates a flush tank or cistern comprising a bottom 6, sides 7 and a removable cover 8.

The numeral 9 indicates an inlet valve of any ordinary or preferred construction, adapted to be opened and closed in the usual manner by the arm 10 which carries a float ball 11 at its outer end.

The flushing mechanism, comprising an operating lever 12, an arm 13, a valve stem 14, a ball valve 15, and a valve seat 16 are of ordinary construction and form no part of my invention, which pertains to means for limiting the movement of the float ball 11.

Heretofore, in the form of flush tank described, the float ball 11, during its downward movement, has come into contact with the ball valve 15, displacing the latter from its true position, and causing it to be improperly seated, which condition results in an undue flow of water through the tank.

According to my invention, however, the float ball 11 may be prevented from interfering with the proper action of the ball valve 15 by means for limiting or controlling the movement of the float ball 11 to keep it away from the ball valve 15 and such means are here illustrated as comprising a split band 17 having outwardly extending flanges 18 and 19 respectively, each flange having a transverse aperture therethrough to receive a threaded bolt 20, the head 21 of which is held against the outer face of the flange 18. A threaded nut 22 engages the bolt 20 for the purpose of securing the band to any suitable member within the tank, such member being here shown as comprising the usual overflow pipe 23.

The band 17 is provided with a hook 24 having a downwardly extending part 25, the upper end of which is secured to the band 17 and an upwardly extending portion 26. The hook 24 is spaced from the part 25. The hook 24 is adapted to engage the arm 10 of the float ball 11 and the position of the band 17 on the overflow pipe 23 determines the lower limit of movement of the float ball 11. The band 17 may be secured to the overflow pipe at any desired height but is positioned so that the float ball 11 will not come into contact with the float valve 15.

While I have herein described one form of my invention, modifications thereof may be devised without departing from the spirit thereof, and it is to be understood that such modifications come within the scope of this invention.

What is claimed is:

1. In a flush tank, the combination with a float ball having an arm, an overflow pipe and means secured to said overflow pipe for engaging said arm and limiting the downward movement of said ball.

2. In a flush tank, the combination of a float ball having an arm, an overflow pipe and means for limiting the downward movement of said ball, said means comprising a hook secured to said overflow pipe, said hook being adapted to engage the arm of said float ball.

3. In a flush tank, the combination of a float ball having an arm, an overflow pipe and means for limiting the downward movement of said ball, said means comprising a band provided with a hook and adjustably secured to said overflow pipe, said hook being adapted to engage the arm of said float ball.

In testimony whereof I have signed my name to this specification.

SARAH E. NOLOP.